(12) United States Patent
Chien et al.

(10) Patent No.: US 9,507,522 B2
(45) Date of Patent: Nov. 29, 2016

(54) VIRTUAL KEYBOARD, ELECTRONIC DEVICE USING THE SAME AND INPUT METHOD

(75) Inventors: Shun-Ta Chien, Daynan Township (TW); Sheng-Ping Su, Zhongli (TW)

(73) Assignee: TPK TOUCH SOLUTIONS INC., Taipei (TW)

( * ) Notice: Subject to any disclaimer, the term of this patent is extended or adjusted under 35 U.S.C. 154(b) by 617 days.

(21) Appl. No.: 12/954,626

(22) Filed: Nov. 25, 2010

(65) Prior Publication Data
US 2012/0013533 A1  Jan. 19, 2012

(30) Foreign Application Priority Data
Jul. 15, 2010 (TW) .............................. 99123232 A (51) Int. Cl.
*G06F 3/02* (2006.01)
*G06F 3/0489* (2013.01)
*G06F 3/0488* (2013.01)

(52) U.S. Cl.
CPC ......... *G06F 3/04897* (2013.01); *G06F 3/0202* (2013.01); *G06F 3/0224* (2013.01); *G06F 3/04886* (2013.01); G06F 2203/04809 (2013.01)

(58) Field of Classification Search
CPC ............................................ G06F 2203/04809
USPC .................................. 345/173–178; 715/773
See application file for complete search history.

(56) References Cited

U.S. PATENT DOCUMENTS

| | | | |
|---|---|---|---|
| 5,666,113 A * | 9/1997 | Logan | 341/34 |
| 5,815,936 A * | 10/1998 | Sieczka et al. | 42/115 |
| 5,934,450 A * | 8/1999 | Rynk | H01H 9/18 200/308 |
| 6,128,183 A * | 10/2000 | Uchiyama | G06F 1/1616 248/919 |
| 6,611,252 B1 * | 8/2003 | DuFaux | 345/168 |
| 6,876,354 B1 | 4/2005 | Terasaki et al. | |
| 2002/0070921 A1 * | 6/2002 | Feldman | 345/168 |
| 2002/0075240 A1 * | 6/2002 | Lieberman et al. | 345/170 |
| 2003/0137494 A1 * | 7/2003 | Tulbert | 345/173 |
| 2004/0216852 A1 * | 11/2004 | Woodward et al. | 160/92 |
| 2004/0233173 A1 * | 11/2004 | Bryant | G06F 3/0202 345/169 |
| 2006/0066586 A1 * | 3/2006 | Gally | G06F 3/045 345/173 |
| 2006/0248462 A1 * | 11/2006 | Ofek et al. | 715/730 |
| 2008/0301575 A1 * | 12/2008 | Fermon | G06F 1/1616 715/773 |
| 2009/0106176 A1 | 4/2009 | Kobayashi | |
| 2009/0322499 A1 * | 12/2009 | Pryor | 340/407.2 |
| 2010/0097327 A1 * | 4/2010 | Wadsworth | G06F 3/04886 345/173 |
| 2010/0259498 A1 * | 10/2010 | Harison | G06F 3/0224 345/173 |
| 2010/0315769 A1 * | 12/2010 | Mathew | G06F 1/1637 361/679.29 |
| 2011/0157037 A1 * | 6/2011 | Shamir | G06F 1/1626 345/173 |

(Continued)

FOREIGN PATENT DOCUMENTS

| | | |
|---|---|---|
| CN | 1855001 | 11/2006 |
| CN | 101271657 | 9/2008 |
| CN | 201716683 U | 1/2011 |

(Continued)

*Primary Examiner* — Priyank Shah
(74) *Attorney, Agent, or Firm* — Hauptman Ham, LLP (57) ABSTRACT

A keyboard includes a holographic film having a holographic information of a keyboard arrangement recorded on a surface thereof; a virtual keyboard generated from the holographic film; and a touch panel adjoining the holographic film, configured to detect an information corresponding to a position being touched thereon. The keyboard is of the advantage of multi-function, convenience and portability. An electronic device using the keyboard and an input method are also disclosed.

20 Claims, 5 Drawing Sheets

(56) References Cited

U.S. PATENT DOCUMENTS

2011/0187832 A1* 8/2011 Yoshida ............... A63F 13/02
348/46
2011/0248960 A1* 10/2011 Gruhlke ............... G06F 3/0416
345/175

FOREIGN PATENT DOCUMENTS

| JP | 10187332 A | 7/1998 |
| JP | 2002041240 A | 2/2002 |
| TW | 292747 | 6/2006 |

* cited by examiner

VIRTUAL KEYBOARD, ELECTRONIC DEVICE USING THE SAME AND INPUT METHOD

This application claims the benefit of Republic of China (Taiwan) Application No. 099123232, filed on Jul. 15, 2010.

FIELD OF THE INVENTION

The present disclosure relates to a keyboard combining touch sensing technology and holographic technology, an electronic device using the keyboard, and an input method.

BACKGROUND OF THE INVENTION

Nowadays, keyboards are the most important and popular input devices of computer equipments. There are many kinds of keyboards, such as mechanical keyboards, membrane keyboards, conductive rubber keyboards, and capacitive keyboards. These keyboards are usually called physical keyboards, which are made up of separate keys with gaps between them. It is difficult to clean the keyboards, since the dust fall into the gaps and accumulate in the gaps easily. After some time, the dust may lead to failure in the work of keyboard. In addition, they have the defects of poor hand feeling, large noise, and rapid wearing, and with the capacitive keyboard, its manufacturing process is relatively more complicated. Furthermore, it is required to mark symbols (such as letters or characters) on the keys of the physical keyboards in different languages for users from different countries, which would lead to inconvenience in switching among different languages. For example, in this industry, laser engraving is a conventional method of marking symbols on the keys. However, once the letters or characters are engraved, it's hard to make alteration. Furthermore, when a mistake has been made, the whole keyboard has to be redone or scrapped.

In recent years, writing pad becomes another popular input device and it is more convenient using writing pad to input information for some users than aforementioned keyboards. However, it cannot work without a specific stylus. Furthermore, sometimes, the writing pad is always used together with aforementioned keyboards. In this case, these two separate devices will take more space in the workplace.

Thus, there is a need of a new input device to overcome the shortcomings of physical keyboards and writing pads and that which integrates the keyboard with a writing pad and a computer mouse.

SUMMARY OF THE INVENTION

The present disclosure addresses the above problems. The object of the present disclosure is to provide a keyboard based on a touch sensing technology and a holography technology with the advantages of multi-function, convenience and portability.

The present disclosure relates, in one embodiment, to a keyboard. The keyboard includes a holographic film having a holographic information of a keyboard arrangement recorded on a surface thereof; a virtual keyboard generated from the holographic film; and a touch panel adjoining the virtual keyboard. The touch panel is configured to generate a touch signal corresponding to a position being touched on the touch panel through the virtual keyboard.

The present disclosure relates, in another embodiment, to an electronic device. The electronic device includes a host, a keyboard, and a transmission device. The keyboard includes a holographic film having holographic information of a keyboard arrangement recorded on a surface thereof; a virtual keyboard generated from the holographic film; and a touch panel adjoining the virtual keyboard. The touch panel is configured to generate a touch signal corresponding to a position being touched on the touch panel through the virtual keyboard; and the transmission device is configured to transmit the touch signal to the host.

The present disclosure relates, in another embodiment, to a method of data input. The method comprises: generating a virtual keyboard from a holographic film positioned on a surface of a touch panel; detecting position information corresponding to a position being touched on the touch panel through the virtual keyboard, and generating and outputting a touch signal corresponding to a key of the virtual keyboard based on the position information.

The keyboard according to the present disclosure combines the multiplex-holography technology with the touch panel. The light beams are projected on the holographic film, such that the virtual keyboard emerges above the holographic film and is close to the touch panel. When users touch the touch panel through the virtual keyboard, the touch panel detects the touching or the gesture at the corresponding position. Therefore, the keyboard can provide striking input, handwriting input, and mouse in put (simulate a mouse). The keyboard can serve as a replacement of a writing tablet and/or a mouse.

Symbols of the keyboard arrangement in different language are recorded on holographic film by multiplex-holography technology instead of the conventional laser engraving, such that errors during the engraving can be avoided and, the reproduction of the holographic film is easy, quick, accurate, and of low cost.

BRIEF DESCRIPTION OF THE DRAWINGS

The components in the drawings are not necessarily drawn to scale, the emphasis instead is being placed upon clearly illustrating the principles of the present disclosure. Skilled persons in the art will understand that the drawings, described below, are for illustration purposes only and do not limit the scope of the present invention in any way. Moreover, in the drawings, like reference numerals designate corresponding parts throughout several views.

DETAILED DESCRIPTION OF THE PREFERRED EMBODIMENTS

The disclosure is illustrated by way of example and not by way of limitation to the figures of the accompanying drawings. The section headings used herein are for organizational purposes only, and are not to be construed as limiting the subject matter described.

Figure 1:
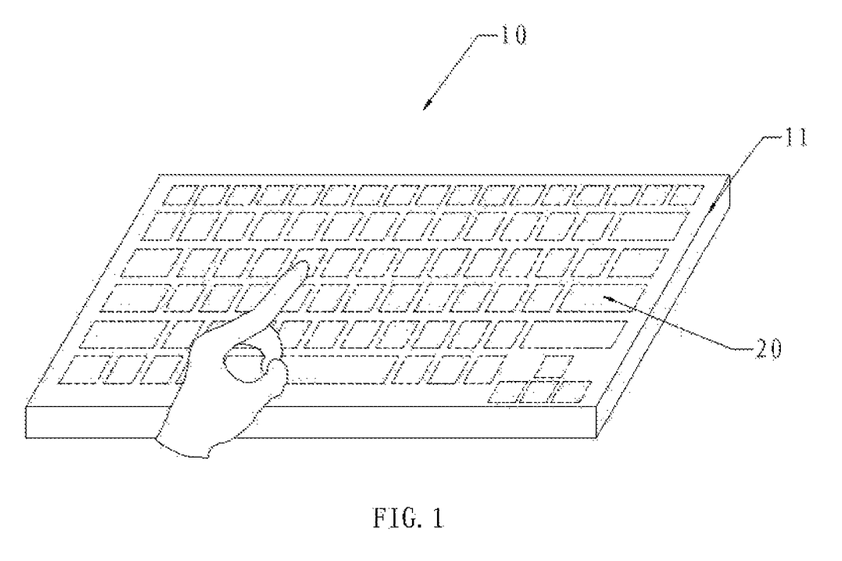
FIG. 1 is a schematic view of a keyboard in accordance with an embodiment of the present disclosure.

Referring to FIG. 1, an embodiment of a keyboard 10 according to the present disclosure is based on a multiplex-holography technology. Keyboard 10 includes a virtual keyboard 20 projected above an upper surface 11. Users can touch keyboard 10 through the virtual keyboard 20. The keyboard 10 can sense gesture inputs, such as a single touch action or successive touch actions, and can generate signals corresponding to these gesture inputs and output the signals. Thus, the keyboard 10 can provide a striking input as well as handwriting input, as well as mouse input.

Figure 2A:
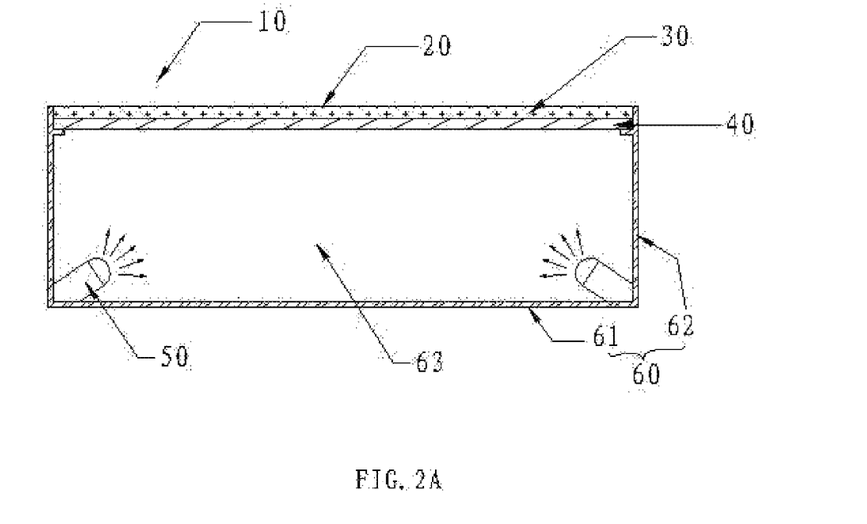
FIG. 2A is a sectional view of the keyboard of FIG. 1 in accordance with an embodiment of the present disclosure.

Referring to FIG. 2A, the keyboard 10 further includes a holographic film 30 having holographic information in a keyboard arrangement, a touch panel 40 for detecting touch signals, and light source 50 for projecting light beams. The holographic film 30 is shaped as substantially a plane and is attached to the upper surface of the touch panel 40.

The holographic film 30 is made of transparent insulation materials, such as glass, emulsion, photonic crystal, or plastic. The holographic film 30 is formed by photographing using a transmission holography technology. During the process of photographing, light beams emitted from a laser source are separated into signal beams and reference beams by a spectroscope. The signal beams and the reference beams are projected on the same side of the holographic film according to the transmission holography technology. After being diffracted and interfered, light waves of the keyboard arrangement carrying the amplitude and phase information of key arrangement and symbols are recorded in the holographic film.

The light source 50 is located under the holographic film 30. The light source 50 project light beams through the touch panel 40 and onto the holographic film 30. The holographic film 30 and the light beams cooperatively generate the virtual keyboard 20. After reconstructing the amplitude and phase information of key arrangement and symbols recorded on the holographic film 30, the virtual keyboard 20 will emerge above the holographic film 30 vividly. Users can touch the touch panel 40 according to the keyboard arrangement of the virtual keyboard 20 for striking input or gesture input. The size, shape, and relative position of the virtual keyboard 20 match that of the holographic film 30.

The touch panel 40 is positioned close to the virtual keyboard 20, for detecting a position being touched on the touch panel 40 and generating touch signals correspondingly. Thus, the size, shape, and relative position of the virtual keyboard 20 matches that of the touch panel 40.

Figure 2B:
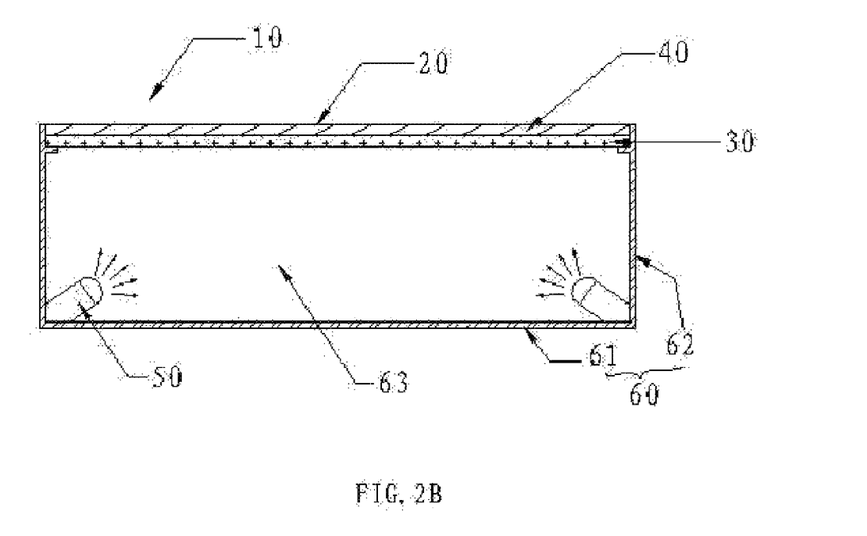
FIG. 2B is a sectional view of the keyboard of FIG. 1 in accordance with another embodiment of the present disclosure.

Referring to FIG. 2B, in an alternative embodiment, the holographic film 30 is disposed under the touch panel 40, and the light source 50 is located under the holographic film 30. The light beams from the light source 50 project onto the holographic film 30 and then generate the virtual keyboard 20 above the touch panel 40. The keyboard 10 in FIG. 2B is of the same working principles with the embodiment shown in FIG. 2A.

When the keyboard 10 serves as an independent device, it may further include a frame 60 to support the components mentioned above. The frame 60 includes a base plate 61 and a plurality of sidewalls 62 extending substantially perpendicular to edges of the base plate 61. The base plate 61 and the sidewalls 62 corporately define a groove 63 having an open end and a closed end. The touch panel 40 is mounted on the frame 60 positioned at the open end of the groove 63, and the light source 50 are positioned at the closed end of the groove 63.

One can attach the holographic film 30 to the touch panel 40 in different ways. One is to use an adhesive material, such as optical clear adhesive (OCA), to bond the holographic film 30 to the touch panel 40 directly. The other one is to use a mechanical structure, such as a detachable structure, to assemble the holographic film 30 to the touch panel 40. It should be noted that, the aforementioned methods could be used together in keyboard 10, if necessary.

Figure 3A:
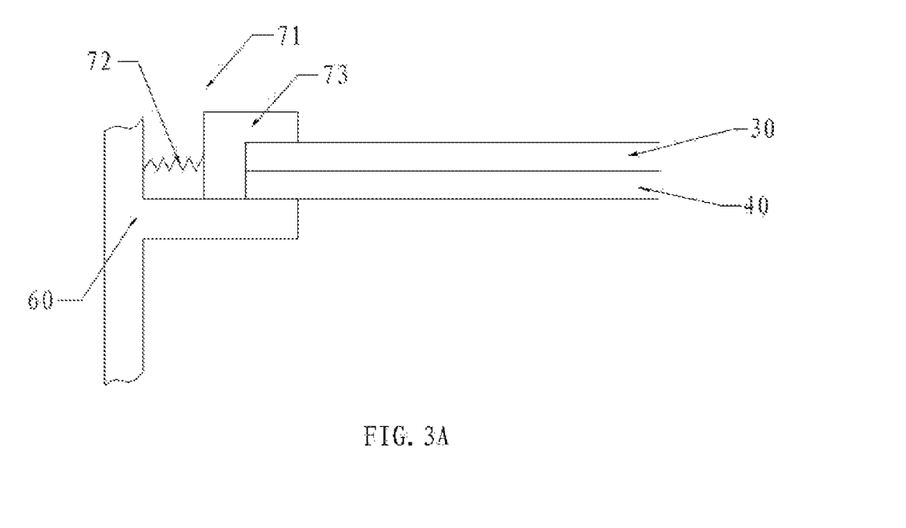
FIG. 3A is an enlarged view of a first embodiment of a detachable structure of the keyboard of FIG. 1.
Figure 3B:
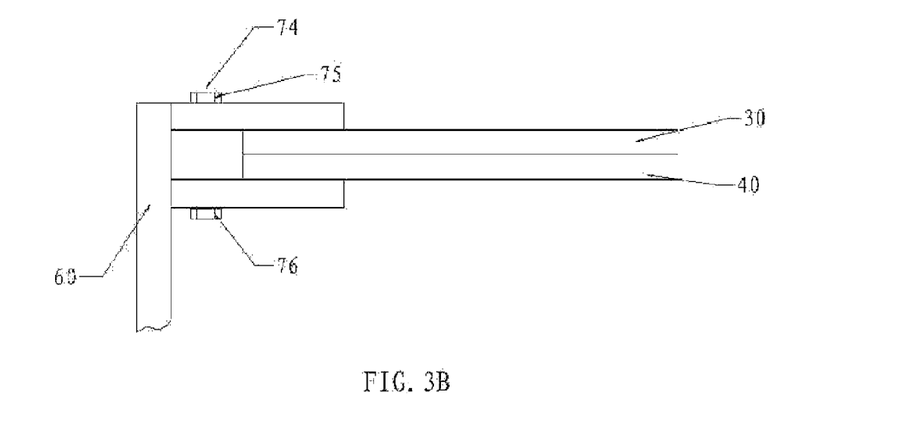
FIG. 3B is an enlarged view of a second embodiment of a detachable structure of the keyboard of FIG. 1.

The detachable structure mentioned above can be designed to fix the holographic film 30 to the touch panel 40, using, for example, snap-fitted connection or bolted connection. Referring to FIG. 3A, a snap-fitted structure 71 is mounted on frame 60 to connect to one end of the holographic film 30 and the touch panel 40. Another snap-fitted structure (not shown) is mounted on the frame 60 to connect to the other end of the holographic film 30 and the touch panel 40. It is symmetrically designed. The snap-fitted structure 71 includes a sliding snap 73 and an elastic element 72. It is easy to change the keyboard 10 from one language to another by simply sliding the sliding snap 73 and replacing current holographic film 30 with a new one required. Referring to FIG. 3B, a bolted structure 74 is mounted on the frame 60 to connect to one end of the holographic film 30 and the touch panel 40. Another bolted structure (not shown) is mounted on the frame 60 to connect to the other end of the holographic film 30 and the touch panel 40. It is also symmetrically designed. The bolted structure 74 includes a bolt 76 and a nut 75 engaging with the bolt 76 on an upper end thereof. A bottom end of the bolt 76 is fixed. It is easy to change the keyboard 10 from one language to another by simply removing the nut 75 and replacing current holographic film 30 with a new one required.

The touch panel 40 could be a transparent capacitive touch panel, or a resistive touch panel, or an infrared sensing touch panel, or an electromagnetic sensing touch panel, or an acoustic wave sensing touch panel.

Figure 7:
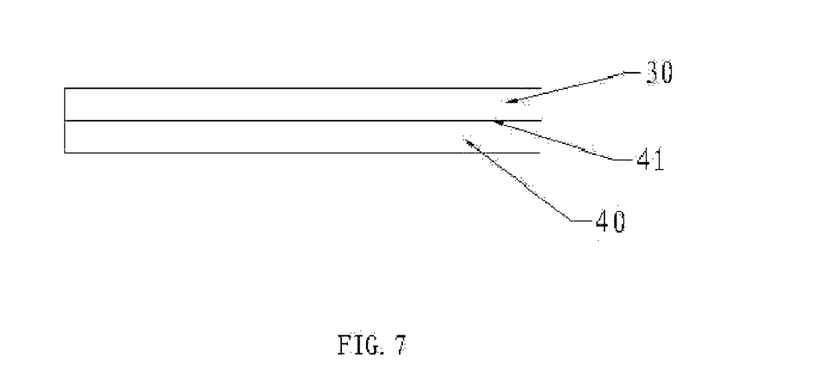
FIG. 7 is an enlarged view of the holographic film and the touch panel of the keyboard of FIG. 1.

The light source 50 can project the light beams onto the holographic film 30 through the touch panel 40. The touch panel 40 includes a sensing layer 41 (as shown in FIG. 7) made of transparent conductive material. The virtual keys on the virtual keyboard 20 according to the keyboard arrangement correspond to a plurality of sensing units of the sensing layer 41. The sensing layer in the touch panel 40 detects the contact position being touched on the keyboard 10.

The light source 50 emitting single color light may be used, such as the Light-Emitting Diodes (LED), Laser Diodes (LD). The keyboard 10 may further include an expender (not shown) disposed in front of the light source 50 for diffusing the light beams. The expender makes the light beams cover the whole surface of the holographic film 30. The quantity and arrangement of the light source 50 are designed based on practical requirements in terms of providing even and sufficient light beams.

Figure 4:
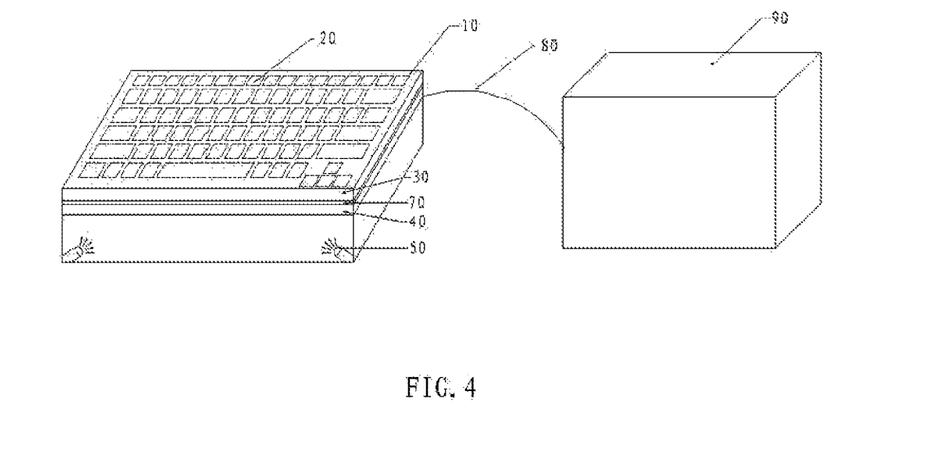
FIG. 4 is a schematic view of a first embodiment of an electronic device using the keyboard of FIG. 1.

The keyboard 10 can be used in electronic devices, such as desktop computers, laptops, and cell phones. Referring to FIG. 4, a first embodiment of an electronic device includes a host 90, the keyboard 10, and a transmission device 80 for transmitting signals to host 90. In this embodiment, the electronic device is a desktop computer. The transmission device 80 is a transmission wire, such as a Universal Serial Bus (USB) wire or an RS-232 wire. It is to be understood that the transmission device 80 may also use wireless transmission technologies, such as Wireless Fidelity technology (WIFI), Radio Frequency Identification technology (RFID), Infrared technology (IR), or Bluetooth technology.

Figure 5:
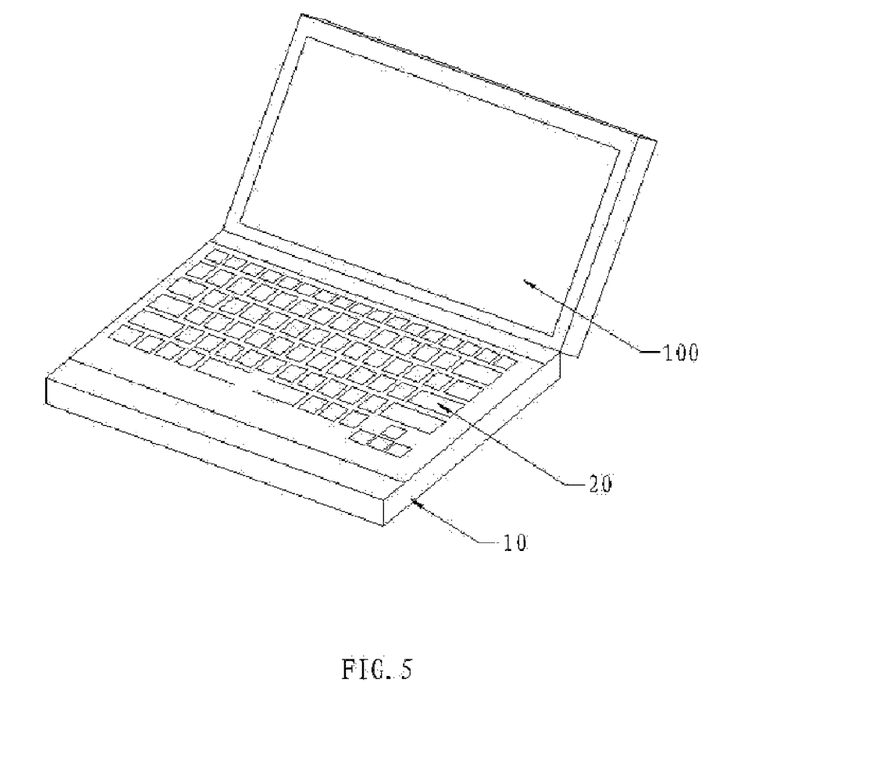
FIG. 5 is a schematic view of a second embodiment of an electronic device using the keyboard of FIG. 1.

Referring to FIG. 5, a second embodiment of the electronic device 100 includes the keyboard 10 integrated into a host. In this embodiment, the electronic device 100 is a laptop. The keyboard 10 in FIG. 5 used in the laptop 100 is of the same working principle and structure with the first applied embodiment in FIG. 4 described before.

Furthermore, the keyboard 10 can be integrated into a tabletop or a wall to be adapted to different circumstances.

Figure 6:
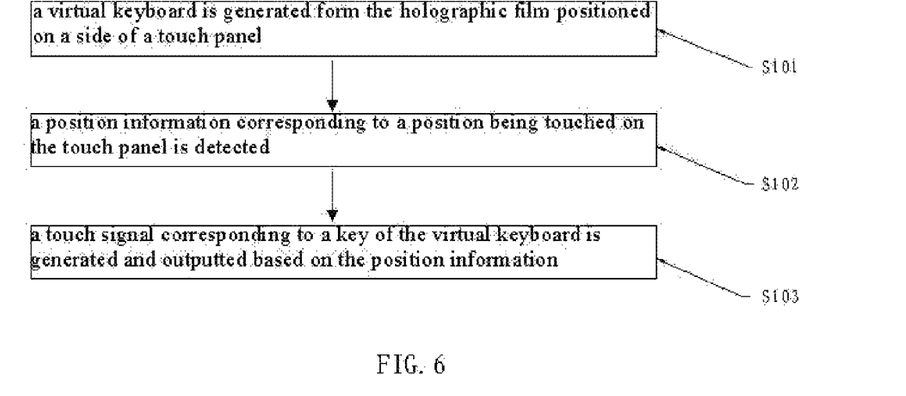
FIG. 6 is a flowchart of an embodiment of an input method according to the present disclosure.

Referring to FIG. 6, an embodiment of an input method using the keyboard is illustrated.

In step S101, a virtual keyboard is generated from the holographic film positioned on an upper or lower surface of a touch panel.

In step S102, position information corresponding to a position being touched on the touch panel, through the virtual keyboard, is detected.

In step S103, a touch signal corresponding to a key of the virtual keyboard is generated and outputted based on the position information.

When using the keyboard 10, the first thing is to record both the arrangement and the symbols in required language into the holographic film 30. When the light, source 50 is powered on, the users can see the virtual keyboard 20 emerging above the holographic film 30. The arrangement, and the characters of the virtual keyboard 20 are the same as that recorded in the holographic film 30 before. The size and shape of the virtual keyboard 20. The holographic film 30 is touched by the users at the corresponding symbols and positions on the virtual keyboard 20. The touch panel 40 detects the position being touched or the gesture made to find out the touch information, to provide striking input, handwriting input and mouse input accordingly.

While certain embodiments have been shown and described, various modifications and substitutions may be made thereto without departing from the spirit and scope of the invention. Accordingly, it is to be understood that the present invention has been described by way of illustration and not limitations.

What is claimed is:

1. A keyboard, comprising:
    a holographic film having a holographic information of a keyboard arrangement;
    a light source disposed corresponding to the holographic film;
    a touch panel adjoining the holographic film, wherein the holographic film is detachably fixed to the touch panel, and the touch panel comprises a touch surface; and
    a snap-fitted assembly connected to the touch panel and the holographic film, wherein the snap-fitted assembly comprises a snap holding and an elastic element, wherein the snap holds the touch panel and is configured to hold the holographic film; wherein the elastic element abutts the snap, and wherein the snap is slidable to replace the holographic film;
    wherein, when in use, light beams emitted from the light source pass through the holographic film to form a virtual keyboard on the touch surface of the touch panel, the touch panel senses at least one physical touch on the touch surface and generates at least one signal corresponding to the virtual keyboard.

2. The keyboard according to claim 1, wherein the light source is positioned under the holographic film to emit, when in use, single-color light beams to generate the virtual keyboard.

3. The keyboard according to claim 1, wherein a size of the virtual keyboard matches that of the touch surface of the touch panel.

4. The keyboard according to claim 1, wherein the snap-fitted assembly is disposed on an end of the touch panel and the holographic film.

5. The keyboard according to claim 1, wherein the holographic film is detachably attached to one surface opposite to the touch surface of the touch panel.

6. The keyboard according to claim 1, wherein the holographic film is made of a transparent insulation material.

7. The keyboard according to claim 6, wherein the transparent insulation material is made of glass, emulsion, photonic crystal or plastic.

8. The keyboard according to claim 1, wherein the holographic film is formed by photographing using a transmission holography technology.

9. The keyboard according to claim 2, wherein the light source is a light emitting diode or a laser diode, and the light beams are single color light.

10. The keyboard according to claim 2, further comprising an expender disposed in front of the light source.

11. The keyboard according to claim 1, wherein the touch panel is a resistive touch panel, a capacitive touch panel, an infrared sensing touch panel, an electromagnetic sensing touch panel, or an acoustic wave sensing touch panel.

12. The keyboard according to claim 1, wherein the touch panel comprises a touch sensing layer.

13. The keyboard according to claim 12, wherein the touch sensing layer comprises a transparent conductive material.

14. The keyboard according to claim 2, further comprising a frame, wherein the touch panel is mounted on the frame and the light source is positioned under the touch panel.

15. The keyboard according to claim 1, wherein the touch panel comprises a touch sensing layer comprising a plurality of sensing units, and a plurality of virtual keys of the virtual keyboard correspond to the plurality of sensing units.

16. An input method, comprising:
    providing a holographic film of a keyboard having a holographic information of a keyboard arrangement and a light source of the keyboard disposed corresponding to the holographic film;
    emitting light beams from the light source to pass through the holographic film to generate a virtual keyboard, wherein the virtual keyboard is positioned on a touch surface of a touch panel of the keyboard, and wherein the holographic film is detachably fixed to the touch panel, and wherein the keyboard comprises a snap-fitted assembly connected to the touch panel and the holographic film, wherein the snap-fitted assembly comprises a snap holding the touch panel and the holographic film and an elastic element abutting the snap, and the snap is slidable to replace the holographic film;
    sensing at least one physical touch on the touch surface by the touch panel; and
    generating at least one signal corresponding to the virtual keyboard.

17. The input method according to claim 16, wherein the touch panel comprises a touch sensing layer comprising a plurality of sensing units, and a plurality of virtual keys of the virtual keyboard correspond to the plurality of sensing units.

18. The input method according to claim 16, wherein the light source is positioned under the holographic film to emit, when in use, single-color light beams to generate the virtual keyboard.

19. The input method according to claim 16, wherein the snap-fitted assembly is disposed on an end of the touch panel and the holographic film.

20. The input method according to claim 16, wherein the holographic film is detachably attached to one surface opposite to the touch surface of the touch panel.

* * * * *